US008521689B2

(12) United States Patent
Alcorn et al.

(10) Patent No.: US 8,521,689 B2
(45) Date of Patent: Aug. 27, 2013

(54) GENERATION OF A SET OF PRE-FILTERS FROM A SET OF EVENT SUBSCRIPTIONS TO MORE EFFICIENTLY SELECT EVENTS OF INTEREST

(75) Inventors: John William Alcorn, Heyworth, IL (US); Kevin Spencer Barker, Raleigh, NC (US); David Michael Eads, Raleigh, NC (US); Joachim H. Frank, Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 1462 days.

(21) Appl. No.: 11/737,928

(22) Filed: Apr. 20, 2007

(65) Prior Publication Data

US 2008/0263093 A1   Oct. 23, 2008

(51) Int. Cl.
*G06F 7/00* (2006.01)
*G06F 17/00* (2006.01)

(52) U.S. Cl.
USPC .......................................................... 707/628

(58) Field of Classification Search
USPC ........................................................... 707/628
See application file for complete search history.

(56) References Cited

U.S. PATENT DOCUMENTS

| | | | | |
|---|---|---|---|---|
| 5,265,004 A | * | 11/1993 | Schultz et al. | 700/22 |
| 5,566,337 A | | 10/1996 | Szymanski et al. | 395/733 |
| 5,881,315 A | | 3/1999 | Cohen | 395/872 |
| 6,477,585 B1 | | 11/2002 | Cohen et al. | 709/318 |
| 6,829,639 B1 | | 12/2004 | Lawson et al. | 709/224 |
| 7,174,557 B2 | | 2/2007 | Sanghvi et al. | 719/318 |
| 2005/0246302 A1 | * | 11/2005 | Lorenz et al. | 706/47 |
| 2006/0085507 A1 | * | 4/2006 | Zhao et al. | 709/206 |
| 2007/0168550 A1 | * | 7/2007 | Wang et al. | 709/238 |

* cited by examiner

*Primary Examiner* — Hosain Alam
*Assistant Examiner* — Van Oberly
(74) *Attorney, Agent, or Firm* — Robert A. Voight, Jr.; Winstead, P.C.

(57) ABSTRACT

A method, system and computer program product for achieving a balance between pre-filter efficiency and pre-filter throughput. Event subscriptions are obtained for a given event consumer. The event subscriptions define the events to be routed to this event consumer. Pre-filters of varying complexity and filtering power are constructed based on these event subscriptions. A balance between pre-filter efficiency and pre-filter throughput may be achieved by selecting the best pre-filter out of these constructed pre-filters to filter events to its associated event consumer. The best pre-filter is selected by comparing a complexity threshold (e.g., a limit for the number of atomic Boolean expressions in a pre-filter) with the actual complexity (e.g., the actual number of atomic Boolean expressions) for each constructed pre-filter and selecting the most complex pre-filter without exceeding the threshold.

13 Claims, 4 Drawing Sheets

GENERATION OF A SET OF PRE-FILTERS FROM A SET OF EVENT SUBSCRIPTIONS TO MORE EFFICIENTLY SELECT EVENTS OF INTEREST

TECHNICAL FIELD

The present invention relates to the field of event processing software, and more particularly to generating a set of pre-filters from a set of event subscriptions to more efficiently select events of interest for event consumers.

BACKGROUND INFORMATION

Event processing software may refer to software that processes events issued by computer systems and applications. Events may include but are not limited to system events and business events. A system event may refer to an event reporting important information regarding the state or performance of a computer system. For example, a system event may be sent when a particular server's processing load or memory utilization exceeds a certain threshold. A business event may refer to an event reporting business information. For example, a business event may notify the arrival of a purchase order. In another example, a business event may indicate the shortage of an item in a warehouse.

These events may be generated by what is referred to herein as "event producers." Event producers, which may be software applications, may be configured to generate an event whose content is set according to criteria established by their configuration. For example, an application in an electronic cash register ("event producer") may generate an event indicating that a certain number of units of a particular product was purchased (e.g., three quarts of milk). The criteria for setting the event content in this example corresponds to indicating that the number of units of a purchased produce should be reported.

The events generated by event producers may be received by what are referred to herein as "event consumers." Event consumers, which may be software applications, may be configured to process an event issued by the event producer. For example, referring to the above example involving the cash register, the event indicating the number of units of the designated product that was purchased may be processed by an application ("event consumer") that keeps track of the number of items for each product on the shelf in the store. The event consumer may process the event by reducing the shelf-inventory for the purchased product by the number of units reportedly purchased.

Each event consumer may be interested in only particular events generated by event producers. For example, referring to the above example involving the cash register, the event consumer may only be interested in events relating to the purchase of store items and not interested in events indicating technical error conditions or events related to the performance of a particular server. As a result, a "pre-filter" may be designed to allow only the events of interest to be sent to the event consumer associated with that pre-filter. Those events that are not of interest to the particular event consumer will be blocked in order to avoid event consumer overload due to "bombardment" with irrelevant events. For example, referring to the above example involving the cash register, a pre-filter may be designed to only allow those events relating to the purchase of store items to be transmitted to the event consumer. The events of interest transmitted to an event consumer are often first routed to a queue, from which they are read and processed by the event consumer in their sequence of arrival.

Event consumers declare which events are of interest to them by using what is commonly referred to as "event subscriptions." Event subscriptions may be formulated as Boolean conditions based on event content. Typically, event subscriptions first test for the event type, from which one may determine the event's structure, and then may test the content of specific fields. For example, an event subscription for events from cash registers that report the purchase of produce items may contain the following expression: eventType='purchaseEvent' and productCategory='produce.' A single event consumer may have several event subscriptions to define the events of interest for the event consumer.

As discussed above, pre-filters may be designed to block events that are not of interest to the event consumer. Pre-filters can be constructed by using criteria derived from the event consumer's event subscriptions. Typically, the more conditions the pre-filter uses to filter out the events not of interest to the event consumer (for example in a pre-filter for purchase order events: the customer has "gold" status; the value of the order is $1,000 or greater; and the order is marked "urgent" indicating that customer desires fast shipment), the greater the efficiency of the pre-filter in distributing only those events of interest to the queue. However, the more complex of the design of the pre-filter (i.e., the more conditions a pre-filter uses to filter out events not of interest), the longer it will take to evaluate it in distributing those events to the queue thereby possibly starving the event consumer. Hence, there is an inverse relationship between pre-filter efficiency (precision in discriminating events) and pre-filter throughput.

Currently, there are no means for achieving a balance between pre-filter efficiency and pre-filter throughput thereby optimizing overall performance in distributing events to event consumers and processing them.

Therefore, there is a need in the art to develop a means for achieving a balance between pre-filter efficiency and pre-filter throughput thereby optimizing overall performance in distributing events to event consumers and processing them.

SUMMARY

The problems outlined above may at least in part be solved in some embodiments by constructing pre-filters of varying complexity and filtering power based on the event consumer's event subscriptions. A balance between pre-filter efficiency and pre-filter throughput may be achieved by selecting the best pre-filter out of these constructed pre-filters to filter events to its associated event consumer. In one embodiment, the best pre-filter is selected by comparing a threshold with the number of atomic Boolean expressions (an atomic Boolean expression may refer to a Boolean expression that is not a conjunction or disjunction of subordinate Boolean expressions) for each constructed pre-filter and selecting the pre-filter that has the largest number of such expressions without exceeding the threshold.

In one embodiment of the present invention, a method for achieving a balance between pre-filter efficiency and pre-filter throughput comprises the step of obtaining a plurality of event subscriptions which define a plurality of events to be routed to an event consumer. The method further comprises constructing a plurality of pre-filters of varying complexity and filtering power. The method further comprises selecting one of the plurality of pre-filters to filter events to the event consumer based on comparing a threshold to a complexity measure for each of the plurality of pre-filters.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for achieving a balance between pre-filter efficiency (filtering power) and pre-filter throughput (conciseness). In one embodiment of the present invention, event subscriptions are obtained for a given event consumer. The event subscriptions define the events to be routed to this event consumer. Pre-filters of varying complexity and filtering power are constructed based on these event subscriptions. A balance between pre-filter efficiency and pre-filter throughput may be achieved by selecting the best pre-filter out of these constructed pre-filters to filter events to its associated event consumer. The best pre-filter is selected by comparing a threshold with the number of atomic Boolean expressions for each constructed pre-filter and selecting the pre-filter that has the largest number of such expressions without exceeding the threshold.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
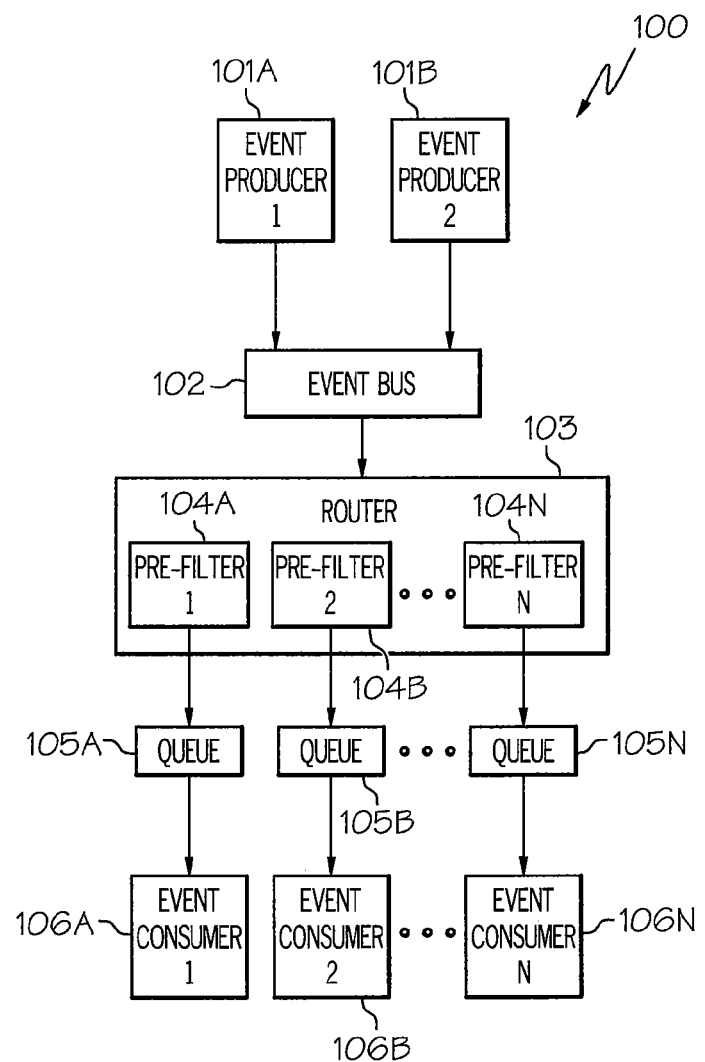
FIG. 1 illustrates an embodiment of the present invention of an architecture for producing and consuming events.

FIG. 1—Architecture for Producing and Consuming Events

FIG. 1 illustrates an architecture 100 for producing and consuming events in accordance with an embodiment of the present invention. Referring to FIG. 1, architecture 100 may include a plurality of event producers 101A-B configured to generate an event in response to criteria established by the user. Event producers 101A-B may collectively or individually be referred to as event producers 101 or event producer 101, respectively. Event producers 101 may generate both system and business events which are distributed onto an infrastructure, referred to herein as the event bus 102. Event bus 102, which may be implemented using software, may refer to a logical entity that transports events between applications/systems. Further, event bus 102 may reside on a different system than event producers 101 and/or event consumers (discussed below) and in essence be representing a network hub connecting these multiple devices together.

Architecture 100 may further include one or more routers 103 coupled to event bus 102 which are configured to "snoop" or "listen" for events distributed onto event bus 102. Router 103 may be implemented in either hardware or software. Router 103 may include a plurality of pre-filters 104A-N, each of which is associated with an event consumer (discussed below) and designed to block most or all events that based on the consumer's subscriptions are not relevant for this event consumer. Pre-filters 104A-N may collectively or individually be referred to as pre-filters 104 or pre-filter 104, respectively.

Architecture 100 may further include a plurality of queues 105A-N coupled to pre-filters 104A-N, respectively, of router 103, which are configured to temporarily store the events distributed by router 103. Queues 105A-N may collectively or individually be referred to as queues 105 or queue 105, respectively. Queues 105 may be coupled to event consumers 106A-N. Event consumers 106A-N may collectively or individually be referred to as event consumers 106 or event consumer 106, respectively. Each queue 105 may be associated with a particular event consumer 106. For example, queue 105A is associated with event consumer 106A, queue 105B is associated with event consumer 106B, and so forth. Further, each queue 105 may be associated with a particular pre-filter 104. For example, queue 105A is associated with pre-filter 104A, queue 105B is associated with pre-filter 104B, and so forth.

Referring to FIG. 1, router 103 may be configured to transmit the events of interest determined by pre-filters 104 to the appropriate queue 105. The events temporarily stored in queue 105 are then read and processed by the associated event consumer 106.

As discussed above, pre-filters 104 are designed to ideally allow only those events of interest to a particular consumer to be sent to event consumer 106 associated with that pre-filter 104. Those events that are not of interest to the particular event consumer 106 should be blocked by the associated pre-filter 104. For example, pre-filter 104A may be associated with event consumer 106A. Hence, pre-filter 104A allows events of interest to that consumer to be sent to event consumer 106A, while blocking events not of interest to event consumer 106A as much as possible. Router 103 transmits the events that passed pre-filter 104A to queue 105A, which is then read and processed by the associated event consumer 106A. Clearly, the presence of pre-filter 104 can lead to a considerable reduction in the processing load of event consumer 106 if it blocks most or all of the events event consumer 106 is not interested in receiving.

While FIG. 1 illustrates architecture 100 including two event producers 101, architecture 100 may include any number of event producers 101, including a single event producer 101. Further, architecture 100 may include any number of routers 103, pre-filters 104, queues 105 and event consumers 106. Architecture 100 may include other components that were not depicted for ease of understanding. Further, architecture 100 is not to be limited in scope to the embodiment illustrated in FIG. 1.

Figure 2:
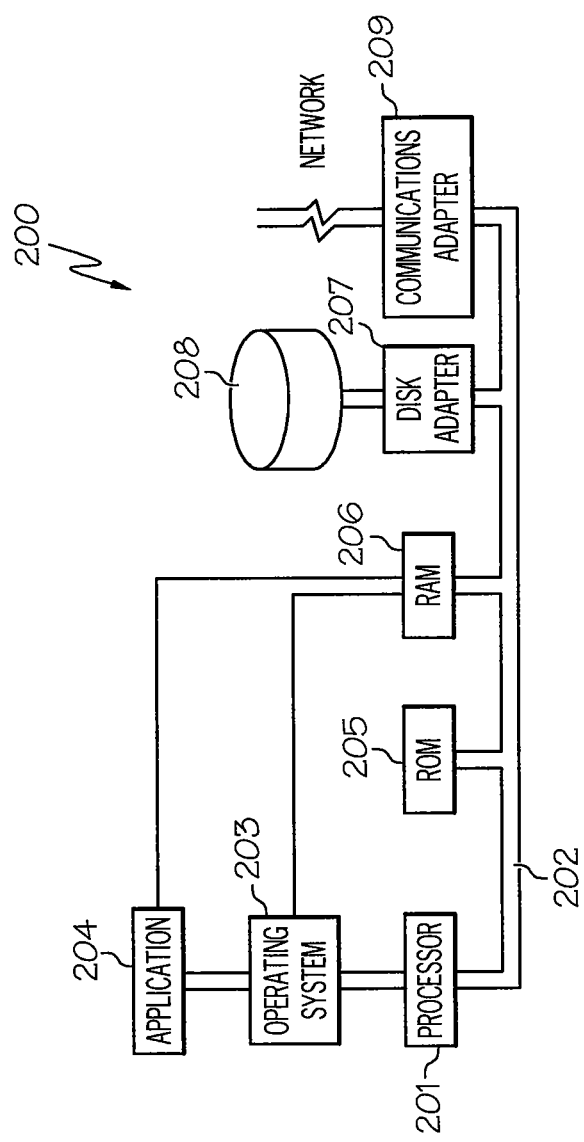
FIG. 2 illustrates a hardware configuration of a computer system in accordance with an embodiment of the present invention.
Figure 3A:
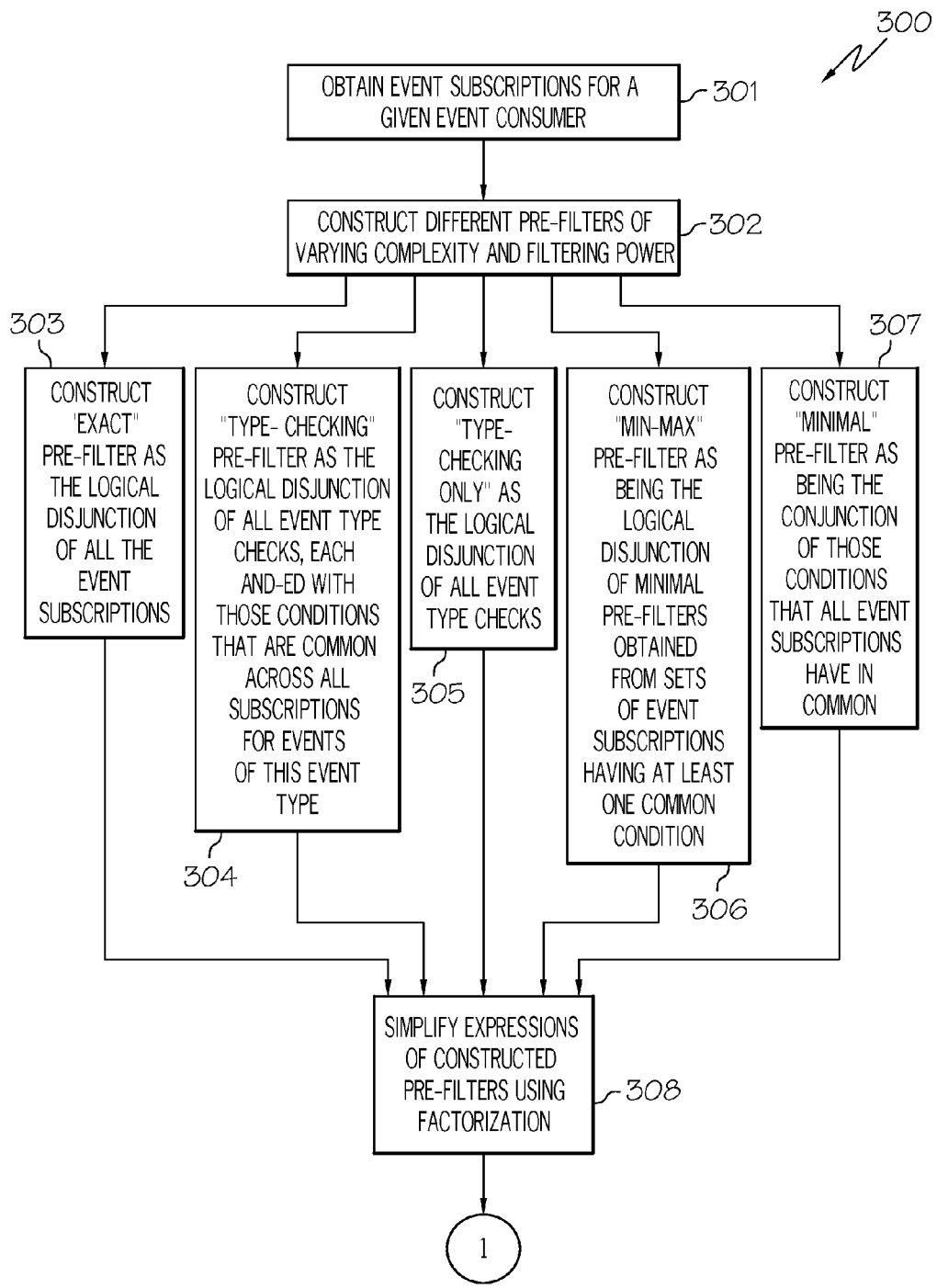
FIGS. 3A-3B are a flowchart of a method for achieving a balance between pre-filter efficiency and pre-filter throughput in accordance with an embodiment of the present invention.
Figure 3B:
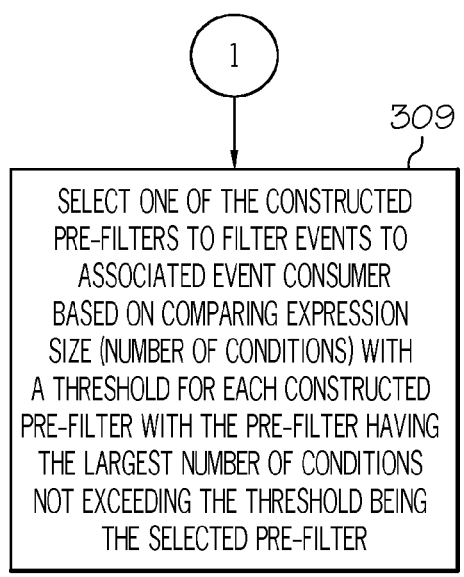

As discussed in the Background Information section, pre-filters may be constructed by using criteria derived from the event consumer's event subscriptions. Typically, the more conditions (e.g., value of $1,000 or greater) the pre-filter uses to filter out the events not of interest to the event consumer, the greater the efficiency of the pre-filter in distributing only those events of interest to the queue. However, the more complex the design of the pre-filter (i.e., the more conditions a pre-filter uses to filter out events not of interest), the longer it will take to evaluate it in distributing those events to the queue thereby possibly starving the event consumer. Hence, there is an inverse relationship between pre-filter efficiency (filtering-power) and pre-filter throughput (conciseness). Currently, there are no means for achieving a balance between pre-filter efficiency and pre-filter throughput thereby optimizing overall performance in distributing and consuming the events. Therefore, there is a need in the art to develop a means for achieving a balance between pre-filter efficiency and pre-filter throughput thereby optimizing overall performance in distributing events to event consumers and processing these events. A means for achieving a balance between pre-filter efficiency and pre-filter throughput thereby optimizing overall performance in distributing events to event consumers and processing events is discussed below in connection with FIGS. 2 and 3A-3B. FIG. 2 is an embodiment of the computer system for practicing the present invention. FIGS. 3A-3B are a flowchart of a method for achieving a balance between pre-filter efficiency and pre-filter throughput.

FIG. 2—Computer System

FIG. 2 illustrates a typical hardware configuration of a computer system 200 which is representative of a hardware environment for practicing the present invention. Computer system 200 may have a processor 201 coupled to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, an application for achieving a balance between pre-filter efficiency and pre-filter throughput as discussed below in association with FIGS. 3A-3B.

Read-Only Memory (ROM) 205 may be coupled to system bus 202 and include a basic input/output system ("BIOS") that controls certain basic functions of computer system 200. Random access memory (RAM) 206 and disk adapter 207 may also be coupled to system bus 202. It should be noted that software components including operating system 203 and application 204 may be loaded into RAM 206, which may be computer system's 200 main memory for execution. Disk adapter 207 may be an integrated drive electronics ("IDE") adapter that communicates with a disk unit 208. e.g., disk drive. It is noted that the application for achieving a balance between pre-filter efficiency and pre-filter throughput, as discussed below in association with FIGS. 3A-3B, may reside in disk unit 208 or in application 204.

Referring to FIG. 2, computer system 200 may further include a communications adapter 209 coupled to bus 202. Communications adapter 209 may interconnect bus 202 with an outside network, e.g., Local Area Network (LAN), Wide Area Network (WAN), enabling computer system 200 to communicate with other such systems.

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, and optical data storage devices. The computer readable medium can also be distributed over network-coupled computer systems so that the computer readable code is stored and executed in a distributed fashion.

FIGS. 3A-3B—Method for Achieving a Balance Between Pre-Filter Efficiency and Pre-Filter Throughout FIGS. 3A-3B are a flowchart of a method 300 for achieving a balance between pre-filter efficiency and pre-filter throughput in accordance with an embodiment of the present invention.

Referring to FIG. 3A, in conjunction with FIGS. 1-2, in step 301, event subscriptions for a given event consumer 106 are obtained, such as from a configuration file associated with event consumer 106 or from code (computer program). Event subscriptions define the events to be routed to this event consumer 106 by router 103. In one embodiment, an editor is used to define the event subscriptions for a given event consumer 106. Event subscriptions may be formulated as Boolean conditions based on event content. For example, an event subscription for an event may be expressed as Boolean conjunctions:

condition_1_1 and condition_1_2 and condition_1_3 and . . .

where the conditions of this event subscription, denoted by "condition_1_j," (where "1" represents the first event subscription and "j" represents the individual condition for the first event subscription) can test the information obtained from incoming events (e.g., timestamp, event type, payload type, payload attribute values, etc.).

In step 302, different pre-filters 104 of varying efficiency (filtering-power) and throughput (conciseness) are constructed based on the event subscriptions obtained in step 301. By constructing pre-filters 104 of varying filtering power and conciseness, a balance between pre-filter efficiency and pre-filter throughput may be achieved by selecting the best pre-filter 104 out of these pre-filters 104 constructed to filter events to its associated event consumer 106 as discussed further below. The various pre-filters 104 that are constructed are discussed in connection with steps 303-307, which may be executed in parallel as illustrated in FIG. 3A. While the following discusses constructing five pre-filters 104 of varying complexity and filtering power, any number of pre-filters 104 may be constructed of varying complexity and filtering power based on the event subscriptions obtained in step 301.

In step 303, a pre-filter 104, referred to herein as the "exact" pre-filter, is constructed as the logical disjunction of all the event subscriptions. For example, suppose that N event subscriptions were obtained in step 301 as indicated below:

condition_1_1 and condition_1_2 and condition_1_3 and . . .

condition_2_1 and condition_2_2 and condition_2_3 and . . .

. . .

condition_N_1 and condition_N_2 and condition_N_3 and . . .

where "N" represents the Nth event subscription. The event pre-filter may then be expressed as follows:

condition_1_1 and condition_1_2 and condition_1_3 and . . . or condition_2_1 and condition_2_2 and condition_2_3 and . . . or

. . .

condition_N_1 and condition_N_2 and condition_N_3 and . . .
which may also be expressed as follows:
    OR_i {AND_j {condition_i_j}}
where "i" represents the particular event subscription and "j" represents the individual condition for that event subscription.

An example to illustrate the exact pre-filter is provided as follows. Suppose, that the N event subscriptions for a process monitor (representing event consumer 106 in this example) that were obtained in step 301 were as follows:
    type="Sent" and proc="Sales" and city="Rome" and cust="Bofi"
    type="Rcvd" and proc="Sales" and city="Rome" and cust="Bofi"
    type="Updt" and proc="Sales" and ship="fast" and year="2002"
    type="Updt" and proc="Sales" and ship="fast" and prod="wine"
    type="Updt" and proc="Sales" and ship="fast" and item="case"
The exact pre-filter for these event subscriptions may then be expressed as follows:
    type="Sent" and proc="Sales" and city="Rome" and cust="Bofi" or
    type="Rcvd" and proc="Sales" and city="Rome" and cust="Bofi" or
    type="Updt" and proc="Sales" and ship="fast" and year="2002" or
    type="Updt" and proc="Sales" and ship="fast" and prod="wine" or
    type="Updt" and proc="Sales" and ship="fast" and item="case"
Hence, the exact pre-filter is the disjunction of all the event subscriptions.

In step 304, a pre-filter 104, referred to herein as the "type-checking" pre-filter, is constructed as the disjunction of all event type checks, each AND-ed with those conditions that are common across all subscriptions for events of this event type. The type-checking pre-filter may be defined to be the following:
    OR {type-check and AND {condition| for ALL (i|(type-check=type-check_i) implies exists (j|condition=condition_i_j)}}
where "i" represents the particular event subscription and "j" represents the individual condition for that event subscription.

An example to illustrate the type-checking pre-filter is provided as follows. As presented above, suppose that the N event subscriptions obtained in step 301 were as follows:
    type="Sent" and proc="Sales" and city="Rome" and cust="Bofi"
    type="Rcvd" and proc="Sales" and city="Rome" and cust="Bofi"
    type="Updt" and proc="Sales" and ship="fast" and year="2002"
    type="Updt" and proc="Sales" and ship="fast" and prod="wine"
    type="Updt" and proc="Sales" and ship="fast" and item="case"
The type-checking pre-filter for these event subscriptions may then be expressed as follows:
    type="Sent" and proc="Sales" and city="Rome" and cust="Bofi" or
    type="Rcvd" and proc="Sales" and city="Rome" and cust=Bofi" or
    type="Updt" and proc="Sales" and ship="fast"
Hence, the type-checking pre-filter is the disjunction of all the different event type checks (represented by "type= . . . ") where each event type check is AND-ed with those atomic Boolean conditions that are common across all event subscriptions for events of this event type.

In step 305, a pre-filter 104, referred to herein as the "type-checking only" pre-filter, is constructed as the logical disjunction of all event type checks. For example, as presented above, suppose that the N event subscriptions obtained in step 301 were as follows:
    type="Sent" and proc="Sales" and city="Rome" and cust="Bofi"
    type="Rcvd" and proc="Sales" and city="Rome" and cust="Bofi"
    type="Updt" and proc="Sales" and ship="fast" and year="2002"
    type="Updt" and proc="Sales" and ship="fast" and prod="wine"
    type="Updt" and proc="Sales" and ship="fast" and item="case"
The type-checking only pre-filter for these event subscriptions may then be expressed as follows:
    type="Sent" or
    type="Rcvd" or
    type="Updt"

In step 306, a pre-filter 104, referred to herein as the "min-max" pre-filter, is constructed by partitioning the event subscriptions obtained in step 301 into sets having at least one common condition; constructing a "minimal" pre-filter for each of these sets by conjunction of those common condition(s); and performing the logical disjunction of these minimal pre-filters. For example, suppose that the N event subscriptions obtained in step 301 were as follows:
    type="Sent" and proc="Sales" and city="Rome" and cust="Bofi"
    type="Rcvd" and proc="Sales" and city="Rome" and cust="Bofi"
    type="Updt" and proc="Sales" and ship="fast" and year="2002"
    type="Updt" and proc="Sales" and ship="fast" and prod="wine"
    type="Updt" and proc="Sales" and ship="fast" and item="case"
    type="Trans" and time="Timestamp" and sev="1"
The min-max pre-filter for these event subscriptions may then be expressed as follows:
    proc="Sales" or {type="Trans" and time="Timestamp" and sev="1"}
Hence, the min-max pre-filter is the logical disjunction of the minimal pre-filter of the first set of the event subscriptions (e.g., "proc="Sales"") with the minimal pre-filter of the second set of the event subscriptions (e.g., "type="Trans" and time="Timestamp" and sev="1"").

In constructing the min-max pre-filter, one may find different possible ways of partitioning the set of event subscriptions obtained in step 301 into subsets of subscriptions having at least one condition in common. One may either construct the min-max pre-filter for each possible partitioning and include all of them in the set of candidate pre-filters or, alternatively, select a partitioning with a maximum average partition size (which is equivalent to selecting one with a minimum number of partitions) and construct the min-max pre-filter for that particular partitioning.

In step 307, a pre-filter 104, referred to herein as the "minimal" pre-filter, is constructed as being the conjunction of those conditions that all of the event subscriptions obtained in step 301 have in common. For example, suppose that the N event subscriptions obtained in step 301 were as follows:

type="Sent" and proc="Sales" and city="Rome" and cust="Bofi"

type="Rcvd" and proc="Sales" and city="Rome" and cust="Bofi"

type="Updt" and proc="Sales" and ship="fast" and year-"2002"

type="Updt" and proc="Sales" and ship="fast" and prod="wine"

type="Updt" and proc="Sales" and ship="fast" and item="case"

The minimal pre-filter for these event subscriptions may then be expressed as follows:

proc="Sales"

Hence, the minimal pre-filter is the conjunction of all those conditions (e.g., "proc="Sales"") common among the event subscriptions obtained in step 301. It is noted that the minimal pre-filter, for the six subscriptions used for illustration of step 306, would be empty since they have no condition in common. In such cases, including the min-max event pre-filter in the set of candidate pre-filters can be particularly important because it may represent the "next best choice" (the smallest non-trivial pre-filter) for such a set of subscriptions.

In step 308, the expressions of the various pre-filters 104 constructed in steps 303-307 are simplified using factorization. Factorization uses the distributive law to transform a Boolean expression into an equivalent expression with fewer terms. Factorization is well known in the art and will not be discussed in detail for the sake of brevity. For example, referring to the above example involving the type-checking pre-filter, the type-checking pre-filter was expressed as follows:

type="Sent" and proc="Sales" and city="Rome" and cust="Bofi" or type="Rcvd" and proc="Sales" and city="Rome" and cust=Bofi" or type="Updt" and proc="Sales" and ship="fast"

Currently, the type-checking pre-filter has 11 conditions. However, by simplifying this expression using factorization, the equivalent expression may only contain 7 conditions. For example, the type-checking pre-filter after using factorization is now expressed as follows:

proc='Sales' and (ship='fast' and type='Updt' or city='Rome' and cust='Bofi' and (type='Rcvd' or type='Sent'))

Referring now to FIG. 3B, in conjunction with FIGS. 1-2, in step 309, one of pre-filters 104 constructed in steps 303-307 is selected to filter events to its associated event consumer 106 based on comparing a complexity threshold (e.g., a limit for the number of atomic Boolean expressions in a pre-filter) with the actual complexity or complexity measure (e.g., the actual number of atomic Boolean expressions) for each of pre-filters 104 constructed in steps 303-307. In one embodiment, the selected pre-filter is the constructed pre-filter that has the largest number of expressions, after its expressions were simplified in step 308, that does not exceed the complexity threshold.

For example, suppose that the exact pre-filter constructed in step 303 has 30 atomic Boolean expressions after simplifying them in step 308; the type-checking pre-filter constructed in step 304 has 19 atomic Boolean expressions after simplifying them in step 308; the type-checking only pre-filter constructed in step 305 has 6 atomic Boolean expressions after simplifying them in step 308; the min-max pre-filter constructed in step 306 has 5 atomic Boolean expressions after simplifying them in step 308; and the minimal pre-filter in step 307 has 1 atomic Boolean expression after simplifying it in step 308, and further suppose that the complexity threshold (threshold for the most complex pre-filter that the routing infrastructure can process in a reasonable time) is 10 atomic Boolean expressions, then the type-checking only pre-filter is selected as the pre-filter to filter events to its associated event consumer 106 since it is the pre-filter that has the largest number of atomic Boolean expressions without exceeding the complexity threshold. In this manner, the best pre-filter that the event routing infrastructure can process in reasonable time is selected to filter the events to be transmitted to its associated event consumer 106 taking into consideration the complexity of the pre-filter as well as the throughput of the pre-filter. That is, a balance between pre-filter efficiency and pre-filter throughput is achieved using method 300 thereby optimizing overall performance in distributing events to event consumers and processing events.

It is further noted that method 300 may include other and/or additional steps that, for clarity, are not depicted. It is further noted that method 300 may be executed in a different order presented and that the order presented in the discussion of FIGS. 3A-3B is illustrative. It is further noted that certain steps in method 300 may be executed in a substantially simultaneous manner (e.g., steps 303-307) or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for achieving a balance between pre-filter efficiency and pre-filter throughput comprising the steps of:

obtaining a plurality of event subscriptions which define a plurality of events to be routed to an event consumer;

constructing a plurality of pre-filters of varying complexity and filtering power; and selecting, by a processor, one of said plurality of pre-filters to filter events to said event consumer based on comparing a threshold to a complexity measure for each of said plurality of pre-filters;

wherein one of said plurality of pre-filters is constructed as being a conjunction of those conditions that all of said plurality of event subscriptions have in common.

2. The method as recited in claim 1, wherein said selected one of said plurality of pre-filters has a largest number of atomic Boolean expressions that does not exceed said threshold.

3. The method as recited in claim 1, wherein one of said plurality of pre-filters is constructed as a logical disjunction of all of said plurality of event subscriptions.

4. The method as recited in claim 1, wherein one of said plurality of pre-filters is constructed as a logical disjunction of all event type checks of said plurality of event subscriptions where each event type check is AND-ed with those atomic Boolean conditions that are common across all subscriptions for events of this type.

5. The method as recited in claim 1, wherein one of said plurality of pre-filters is constructed as a logical disjunction of all event type checks of said plurality of event subscriptions.

6. The method as recited in claim 1, wherein one of said plurality of pre-filters is constructed by: partitioning said plurality of event subscriptions into sets having at least one common condition; performing a conjunction of those common conditions for each of said sets; and performing a logical disjunction of said conjunction of those common conditions for each of said sets.

7. The method as recited in claim 1 further comprising the step of:
simplifying expressions of said plurality of pre-filters using factorization.

8. A system, comprising:
a memory unit for storing a computer program for achieving a balance between pre-filter efficiency and pre-filter throughput;
a processor coupled to said memory unit, wherein said processor, responsive to said computer program, comprises:
    circuitry for obtaining a plurality of event subscriptions which define a plurality of events to be routed to an event consumer;
    circuitry for constructing a plurality of pre-filters of varying complexity and filtering power; and
    circuitry for selecting one of said plurality of pre-filters to filter events to said event consumer based on comparing a threshold to a complexity measure for each of said plurality of pre-filters;
    wherein one of said plurality of pre-filters is constructed as being a conjunction of those conditions that all of said plurality of event subscriptions have in common.

9. The system as recited in claim 8, wherein said selected one of said plurality of pre-filters has a largest number of atomic Boolean expressions that does not exceed said threshold.

10. The system as recited in claim 8, wherein one of said plurality of pre-filters is constructed as a logical disjunction of all of said plurality of event subscriptions.

11. The system as recited in claim 8, wherein one of said plurality of pre-filters is constructed as a logical disjunction of all event type checks of said plurality of event subscriptions where each event type check is AND-ed with those atomic Boolean conditions that are common across all subscriptions for events of this type.

12. The system as recited in claim 8, wherein one of said plurality of pre-filters is constructed as a logical disjunction of all event type checks of said plurality of event subscriptions.

13. The system as recited in claim 8, wherein one of said plurality of pre-filters is constructed by: partitioning said plurality of event subscriptions into sets having at least one common condition; performing a conjunction of those common conditions for each of said sets; and performing a logical disjunction of said conjunction of those common conditions for each of said sets.

* * * * *